J. ARBOS.
GAS ENGINE.
No. 40,805.  Patented Dec. 8, 1863.
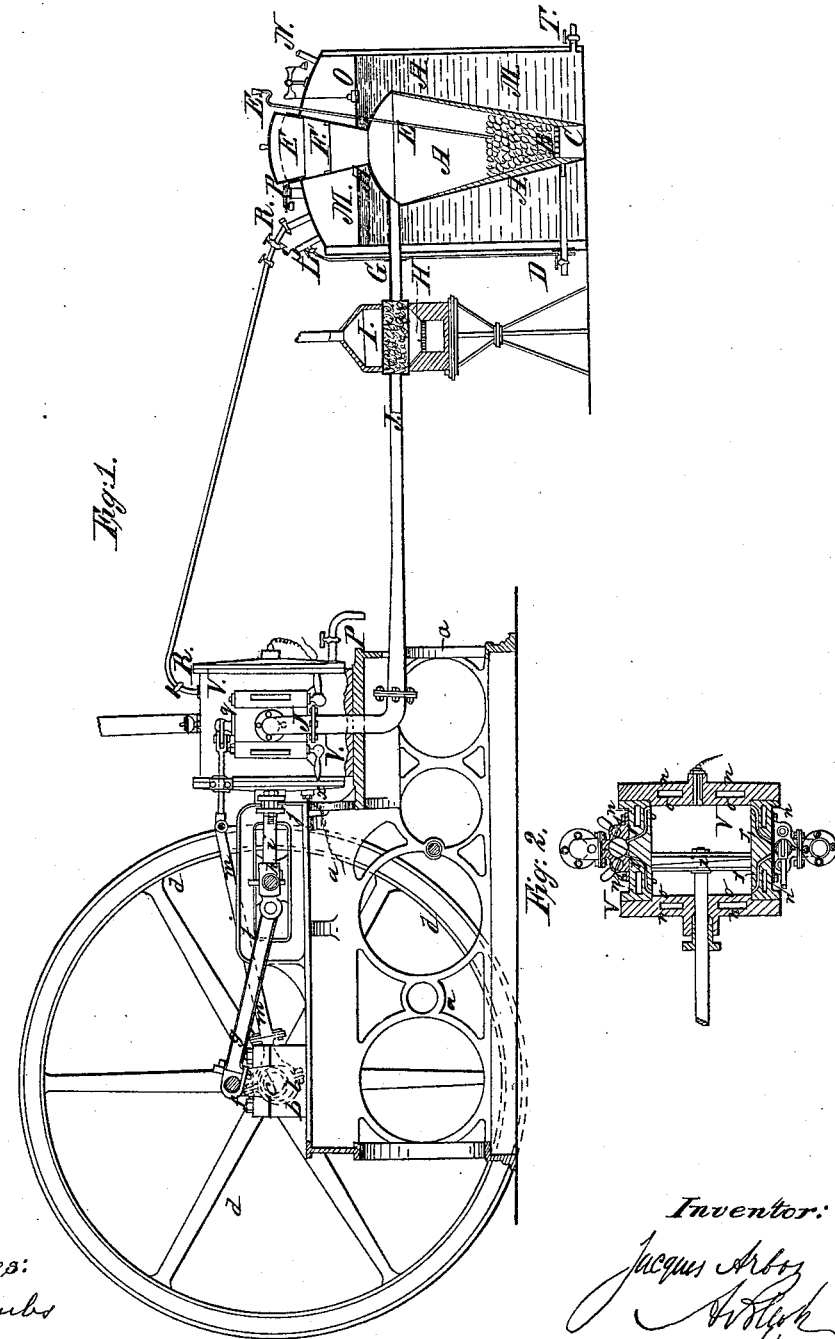
Witnesses:
J. L. Coombs
Charles French
Inventor:
Jacques Arbos

UNITED STATES PATENT OFFICE.

JACQUES ARBÓS, OF BARCELONA, SPAIN.

IMPROVEMENT IN GASES FOR MOTIVE POWER.

Specification forming part of Letters Patent No. 40,805, dated December 8, 1863.

*To all whom it may concern:*

Be it known that I, JACQUES ARBÓS, of Barcelona, in the Kingdom of Spain, have invented certain new and useful Improvements in Generating Certain Gases for Obtaining Motive Power and in the Apparatus Employed Therein; and I do hereby declare that the following is a full, clear, and exact description thereof, reference being had to the accompanying drawings.

My invention consists in a new gas-engine, together with an apparatus for generating the gas, constituting one complete apparatus, as hereinafter described, whereby motive power is created and transmitted. Its characteristic feature is the production of a gaseous mixture composed of oxide of carbon, of hydride of azote, and of a small proportion of carburet of hydrogen. This compound, combined with air in proportions varying with its richness in carburet of hydrogen, and inflamed or exploded by an electric spark or by red-hot platinum wires, exerts inside a cylinder a pressure which becomes a motive power upon a piston therein, which power is transferred to the main shaft of the engine or apparatus to be transmitted or used as required. At the same time as the gaseous compound is generated steam is produced, which may also be employed as a motive power, and may be used in a cylinder coupled with the gas-engine.

Figure 1 of the accompanying drawings is an elevation of my apparatus for generating gas and steam, and of a gas-engine constructed according to this invention.

I will first describe the apparatus for generating gas and steam, and then proceed to explain the construction and working of the engine in which I employ the gas for obtaining motive power.

The apparatus for generating gas and steam is composed of two principal parts—a furnace placed in the center and a steam-boiler surrounding the furnace.

A is the furnace, which is lined with fire brick.

B is a circular grating for allowing air to pass into the furnace.

C is the ash-pit.

D is a pipe through which air is forced into the furnace under the grating at the commencement of the operation, and through which air at the ordinary pressure is allowed to pass when the apparatus is at work. A door regulates the admission of air into the furnace. According to the nature of the fuel employed it will be found desirable in some cases to force in air by means of a fan or otherwise during the whole time of the operation.

F is a conical opening, closed by a stopper. This opening serves for the introduction of fuel into the furnace and for the exit of the gases evolved at the commencement of the operation. The stopper may be furnished with a trap.

L is a pipe for leading steam into the pipe D, to be mixed with the air admitted to the furnace.

E is a siphon-tube for introducing liquid combustible material into the furnace to increase the intensity of the gaseous mixture.

G is a pipe for conveying the gaseous mixture from the furnace.

H is a metal or fire-brick vessel, which may be cylindrical or of other suitable shape. This vessel contains coal heated to red heat for decomposing the carbonic acid and vapors which may have escaped decomposition in the furnace A.

I is a furnace or fire place for heating the vessel H. This furnace I may be dispensed with, the vessel H in such case being placed in the furnace A.

J is a pipe for leading the gaseous compound into the cylinder of the engine after it has been mixed with a sufficien, quantity of air to allow of its being inflamed or exploded, as hereinafter described.

M is a steam-boiler, protected by some non-conductor to prevent loss of heat by radiation. The water in the boiler is heated by the furnace A, whereby steam is generated.

T is a cock for emptying the boiler when necessary.

N is a tube leading to a gage for indicating the pressure.

O is a float for indicating the water-level.

P is a safety-valve.

R is a pipe for supplying the boiler with water which has been previously heated in the jacket of the cylinder of the gas-engine by the combustion of the gases inside the said cylinder, as hereinafter described.

S is a pipe for leading steam from the boiler o a steam-chest, engine, or other destination.

To set the apparatus for generating gas and steam to work, I light up the furnaces A and I, and fill the furnace A with coal, air being admitted thereinto by the pipe D. When the gases which pass off by the opening F become inflammable, I close the opening and the gaseous mixture then passes off by the pipe G into the vessel H, which is full of incandescent fuel. It then passes through the pipe J into the cylinder V of the gas-engine, where it is exploded or inflamed by an electric spark or by red-hot platinum wires, and thus produces sufficient force to cause the piston of the engine to make a half-course, the to-and-fro motion of which piston produces the rotation of the principal shaft in the ordinary manner. If it be desired to obtain a gaseous mixture richer in inflammable materials, I introduce into the furnace A, by means of the siphon-tube E, tar, oils of resin, of petroleum, and of schist, or the like, or other fatty matters, according to the richness in carburets of hydrogen that it is desired to impart to the gaseous mixture.

In some cases, instead of or in addition to employing the fatty matters just named, I introduce steam into the furnace by the pipe L.

During the formation of the gaseous mixture great heat is produced in the furnace A, which is transmitted to the water in the boiler M. The boiler is supplied with water heated in the jacket of the cylinder V of the gas-engine by the combustion of the gaseous mixture in the said cylinder. By the aid of a force-pump worked by the engine cold water is made to enter the lower part of the cylinder V, and becoming heated, as before mentioned, to a high temperature passes off at the upper part of the said cylinder to the boiler M. I therefore obtain, by means of my invention, two motive agents—videlicit, that produced by the combustion of the gaseous mixture, and that of steam produced by the heating of water in the jacket of the cylinder V, and in the boiler M, which incloses the furnace A.

My new gas-engine is shown in sectional elevation in Fig. 1. Fig. 2 is a horizontal section of the cylinder, illustrating the distribution and working of the gaseous mixture. The engine is supported on a frame, $a$, the main driving-shaft $c$ carries a fly-wheel, $d$, and revolves in bearings $b$, carried by the frame. The connecting-rod $g$ is united to the head $h$ of a piston-rod, $i$, which head slides in guides $j$, and carries a commutator for producing an electric spark and communicating it first at one and then at the other end of the cylinder V. An eccentric, $l$, united to a rod, $m$, works the slide-valves of the cylinder V, which latter is constructed in the following manner: The sides are made with a double casing or jackets, $n$ $o$, in which water fed by a supply-pump through the pipe $p$ circulates, and while so doing becomes heated and passes through the pipe R to the boiler M. The gaseous mixture generated in the furnace A, as before described, and conducted by the pipe J, is admitted to the cylinder V by the valve $q$. This valve has two openings, to allow passage of the gas into the passages $r$ $r$ of the cylinder. The openings are arranged in such manner that one or other is closed, according as the valve $q$ is turned in one or the other direction. Each of the openings comes successively in connection with the pipe J, and at the same time a small lateral channel on the plug of the valve comes opposite a lateral opening, $s$, formed on the valve-box. This opening is commanded by a tap worked by hand, by means of which I am enabled to regulate the quantity of air admitted with the gaseous mixture. The gaseous mixture being introduced into the cylinder V, and the piston-rod $i$ working the commutator, the latter completes the electric circuit at the required moment, the electric spark produced in the part $v$, in which the platinum wires $x$ are lodged, ignites the gaseous mixture in the cylinder, which in expanding drives the piston from one end of the cylinder to the other and reverses the position of the armature. A similar action takes place on the other side of the piston, and so on. In consequence of the successive explosions of the gaseous mixture, the water maintained in the jacket of the cylinder becomes heated and returns to the boiler M, to be replaced by the cold water supplied by the pump. The products of combustion of the gaseous mixture in the cylinder V escape by passages and slides similar to the inlet-passages on the opposite side of the cylinder.

And having now described the nature of my said invention, and in what manner the same is to be performed, I declare that I claim—

1. The production of a gaseous mixture, composed of oxide of carbon, of hydride of azote, and of a small proportion of carburet of hydrogen, said compound being combined with air and used as a motive power, in the manner hereinbefore set forth.

2. The apparatus for generating the gaseous mixture, to be used in the manner substantially as hereinbefore described and illustrated in the accompanying drawings.

3. The generation of steam by the heating of water in the jacket of the cylinder of the said gas-engine, and in a boiler surrounding the furnace of the said gas-generating apparatus, substantially as hereinbefore described.

In testimony whereof I have signed my name to this specification before two subscribing witnesses.

J. ARBÓS.

Witnesses:
MARUS. SLUCH,
E. JAUMES.